United States Patent [19]
Hintzen et al.

[11] Patent Number: 4,575,439
[45] Date of Patent: Mar. 11, 1986

[54] METHOD OF PRODUCING A REFRACTORY BRICK

[75] Inventors: Ullrich Hintzen, Taunusstein; Michael Neuenburg, Hallgarten, both of Fed. Rep. of Germany

[73] Assignee: Didier-Werke AG, Wiesbaden, Fed. Rep. of Germany

[21] Appl. No.: 628,626

[22] Filed: Jul. 6, 1984

[30] Foreign Application Priority Data

Jul. 21, 1983 [DE] Fed. Rep. of Germany ....... 3326270

[51] Int. Cl.$^4$ ...................... C04B 33/04; C04B 35/04; C04B 35/48
[52] U.S. Cl. ......................... 264/43; 106/88; 106/106; 264/44; 264/60; 501/84; 501/108; 501/118; 501/119
[58] Field of Search ............... 264/43, 60, 44; 501/84, 501/89, 107, 127, 119, 108, 118; 106/88, 106

[56] References Cited

U.S. PATENT DOCUMENTS

| 4,158,685 | 6/1979 | Masaryk | 264/43 |
| 4,207,114 | 6/1980 | Schuster | 264/43 |
| 4,248,810 | 2/1981 | Erskine | 264/43 |
| 4,356,271 | 10/1982 | Francis et al. | 264/43 |

Primary Examiner—Philip Anderson
Attorney, Agent, or Firm—Wenderoth, Lind & Ponack

[57] ABSTRACT

Method of producing a refractory light-weight brick from a mixture of a granular refractory material, a binder, a foaming agent, further addition agents, and water, wherein the mixture is poured as a foamed, aqueous slurry into molds and the set moldings are dried and fired. The mixture contains, by weight, 1–10% hydrated aluminumhydroxychloride, 0.1–3% magnesia (MgO) and 87–97% refractory material. The slurry sets rapidly in the molds.

11 Claims, No Drawings

METHOD OF PRODUCING A REFRACTORY BRICK

BACKGROUND OF THE INVENTION

The present invention relates to a method of producing a refractory brick, and is especially applicable to the production of light-weight refractory bricks.

Refractory light-weight bricks that are made from a watery slurry are known. The slurry contains a refractory granular material such as, for example, fired clay and sintered alumina having a grain size up to 2 mm, a binder, and a pore-forming foaming agent. The binder may consist of a solution of sulphite spent liquor (sodium lignosulphonate), methylcellulose, sodium silicate, a sodiumphosphate compound, a sol of silicic acid, or an aqueous binder.

According to West German Unexamined Application No. 1 965 008, a watery colloidal dispersion of silicon oxide or aluminum oxide is used for the manufacture of a ceramic light-weight product. During heating of the mixture in molds, foam is generated by decomposing alkali carbonate, and the molding is allowed to set. According to U.S. Pat. No. 2,235,881, a porous fired brick is produced from a ceramic slurry containing a foaming agent. To achieve stiffening by the formation of an aluminum oxide gel, an aluminum salt, such as aluminum chloride, is first added to the mixture, then, as the last component of the mixture, ammonium hydroxide is added.

The manufacture of these refractory light-weight bricks involves complex production steps and the formation of gases that are hazardous to health. Furthermore, the bricks obtained after the stiffening and setting of the mixtures do not have satisfactory properties and, in particular, they lack sufficient strength.

Aluminumhydroxychloride $(Al_2(OH)_5Cl.2-3H_2O)$ can also be employed as a binder for refractory products with a high bulk density, and is stable in an acidic aqueous solution under a pH value of 5. Bonding and setting occur with the thermal treatment of the moldings by drying and firing.

SUMMARY OF THE INVENTION

The object of the present invention is to provide a method of producing a refractory brick, particularly a light-weight refractory brick, which results in structurally uniform and rapidly setting bricks.

This object is achieved, in accordance with the present invention, by a method which comprises providing a foamed, aqueous mixture containing hydrated aluminumhydroxychloride, a first refractory material and a granular second refractory material, introducing the foamed mixture into a mold and allowing the mixture to set in the mold, removing the molded article from the mold and drying it, and firing the dried article to produce the refractory brick.

DETAILED DESCRIPTION OF THE INVENTION

More specifically, the present invention provides a method of producing a refractory brick which comprises providing a foamed, aqueous mixture containing 1–10% of hydrated aluminumhydroxychloride, 0.1–3% of at least one first refractory material selected from the group consisting of sintered magnesia and caustic-calcined magnesia, and 87–97% of a granular second refractory material, said amounts being based on the combined weight of said aluminumhydroxychloride and first and second refractory materials; introducing said foamed, aqueous mixture into a mold and allowing said mixture to set; removing the resultant molded article from said mold and drying said molded article; and firing the dried article to produce a refractory brick.

According to the invention, refractory light-weight bricks are surprisingly obtained by means of a method which has only a few production steps, and with fast setting of the foamed slurry which has been poured into molds.

In a preferred aspect of the invention, the foamed aqueous mixture is prepared by mixing a first mixture containing the hydrated aluminumhydroxychloride, the second refractory material and water, with a second mixture containing the first refractory material, a foaming agent and water. This results in uniform distribution or dispersion of the first refractory material in the foamed, aqueous mixture, particularly when the first refractory material is fine-grained.

The time elapsing immediately after the pouring of the mixture into molds to its setting (green strength of the molding), at the end of which the moldings can be stripped from the molds without the danger of spalling, is from 10 to 20 minutes. The setting of the molding is indicated by the fact that the surface of the slurry poured into the mold takes on a dull appearance, and the molding can be easily stripped from the mold. The resulting green strength of the moldings also enables them to be transported, so that after their removal from the molds they can be used immediately. Light-weight bricks are obtained whose bulk density ranges from 0.4 to 1.8 g/cm$^3$.

The sintered magnesia used as a first refractory material may be a technical sintered magnesia with at least 90% by weight of MgO, and preferably has a grain size under 0.1 mm, particularly under 0.063 mm. By increasing the fineness of the sintered magnesia and using caustic-calcined magnesia, also preferably having a grain size of under 0.1 mm, the time required for setting of the mixture can be reduced.

By using the various granular second refractory materials, light-weight bricks can be obtained for high temperature application and/or having great resistance to mechanical strain, corrosion, and change in temperature.

By partially substituting the granular second refractory material by combustible substances, the porosity of the fired light-weight bricks made according to the foamed slurry process can advantageously be increased further without substantially reducing the brick strength. Known materials, such as sawdust, breeze, polystyrene, cork meal and organic fibers can be used as the combustible substances. The sawdust and cork meal should be prewetted slightly with water in order to obtain a slurry with uniform consistency.

The amount of the combustible substance in the foamed, aqueous mixture is preferably 1–30% by weight based on the combined weight of the aluminumhydroxychloride, first refractory material and second refractory material. More preferably, the amount of the combustible substance is 1–10% by weight, on the same weight basis.

Examples of the second refractory material include corundum, kaolin, sintered mullite, sillimanite, chamotte, synthetic cordierite, cordierite-containing aluminosilicate, clay and zirconia. Any aluminosilicate can be used. These second refractory materials preferably have a grain size of not greater than 1 mm. The clay and zirconia are most preferably used in a fine grain size, i.e. less than 0.1 mm. The other second refractory materials can be used in a coarse grain size of 0.1–1 mm and in a fine grain size of less than 0.1 mm.

An especially preferred foamed, aqueous mixture is one which contains 3–7% by weight of hydrated aluminumhydroxychloride, 0.3–1.4% by weight of caustic-calcined magnesia, and 91.6–96.7% by weight of the second refractory material.

In the embodiment of the present invention wherein the foamed, aqueous mixture is prepared by mixing a first mixture and second mixture as described above, it is preferable that the second mixture contain 0.1–10% by weight of the foaming agent and 1–40% by weight of water, based on the combined weight of the aluminumhydroxychloride and first and second refractory materials. The foaming agent is preferably one which is stable in water at a pH of 3–10.

It is also preferable that the first mixture, which contains the hydrated aluminumhydroxychloride, granular second refractory material and water, further contain a dispersing agent or suspension agent, for example bentonite, to prevent coarse grains in the mixture from settling out of the mixture.

The foaming agents which can be used in the present invention include commercial products, such as ammoniumalkylether sulphate. As indicated above, the amount of the foaming agent is preferably 0.1–10% by weight. If the amount of foaming agent is within this range, the bulk density of the bricks will change only slightly.

The present invention will be illustrated in further detail by the following examples, which are not intended to limit the invention.

EXAMPLES 1–15

Each mixture of the foamed, aqueous slurry was obtained by adding the second mixture, containing the foaming agent, to the first mixture as described above. The constituents for the first mixture were introduced into the mixing apparatus in the following order: water, hydrated aluminumhydroxychloride, granular second refractory material, and any other addition agents.

After pouring the foamed slurry into molds, setting, and removal of the moldings, the latter were dried for 48 hours at 110° C., then fired for 5 hours with the temperature rising at 100° C./hour to the prevailing firing temperature.

Caustic-calcined magnesia with 99% by weight of MgO, and magnesia sinter with 95% by weight of MgO, each with a grain size of under 0.063 mm, is employed. Ammoniumalkylether sulphate was used as a foaming agent.

The mixtures of Examples 1 to 3 show for a chamotte light-weight brick the increase in green strength and the strength after firing with increasing amounts of aluminumhydroxychloride. Examples 4 and 5 show amounts of magnesia at the lower and upper limits. Examples 2, 4 and 5 particularly show the dependency of the processing time (pot life) and the setting time on the magnesia content.

The influence of increasing amounts of the foaming agent on bulk density is apparent from Examples 2, 7 and 8. Examples 9 to 12 show the use of, e.g., sawdust, as a combustible substance.

Examples 13, 14 and 15 show mixtures for refractory light-weight bricks with special characteristics. Example 13 shows a light-weight brick with greater resistance to thermal shock derived from the cordierite-containing aluminosilicate chamotte (content of about 60% by weight cordierite, $2MgO.2Al_2O_3.5SiO_2$). A higher temperature of application and resistance to corrosion can be achieved with the light-weight bricks of Examples 14 and 15.

|  | Example | | | | | |
|---|---|---|---|---|---|---|
|  | 1 | 2 | 3 | 4 | 5 | 6 |
| First mixture: | | | | | | |
| Aluminumhydroxychloride | 1 | 6 | 10 | 5 | 5 | 5 |
| Water | +30 | +30 | +30 | +30 | +30 | +30 |
| Kaolin (40% $Al_2O_3$) | 30 | 30 | 30 | 30 | 30 | 30 |
| Chamotte (0.1–1.0 mm) | 20 | 20 | 20 | 20 | 20 | 20 |
| Chamotte (<0.1 mm) | 48 | 43 | 39 | 44.9 | 42 | 42 |
| Sawdust (<2 mm) | | | | | | |
| Second mixture: | | | | | | |
| Caustic-calcined magnesia | 1 | 1 | 1 | 0.1 | 3 | |
| Magnesia sinter | | | | | | 3 |
| Foaming agent | +1 | +1 | +1 | +1 | +1 | +1 |
| Water | +15 | +15 | +15 | +15 | +15 | +15 |
| Pot life (minutes) | 5 | 5 | 5 | 20 | 1 | 4 |
| Setting time (minutes) | 40 | 40 | 40 | 120 | 10 | 30 |
| Strength green | slight | medium | good | slight | medium | medium |
| Strength fired (N/mm$^2$) | 1.2 | 1.7 | 2.5 | 1.5 | 1.5 | 1.5 |
| Bulk density after firing (g/cm$^3$) | 0.65 | 0.68 | 0.70 | 0.67 | 0.67 | 0.67 |
| Firing temperature (°C.) | 1300 | 1300 | 1300 | 1300 | 1300 | 1300 |

|  | Example | | | | | |
|---|---|---|---|---|---|---|
|  | 7 | 8 | 9 | 10 | 11 | 12 |
| First mixture: | | | | | | |
| Aluminumhydroxychloride | 5 | 5 | 5 | 5 | 5 | 5 |
| Water | +30 | +30 | +30 | +30 | +40 | +30 |
| Kaolin (40% $Al_2O_3$) | 30 | 30 | 30 | 30 | 20 | 20 |
| Chamotte (0.1–1.0 mm) | 20 | 20 | 20 | 20 | 20 | 20 |
| Chamotte (<0.1 mm) | 44 | 44 | 39 | 34 | 24 | 53 |
| Sawdust (≦2 mm) | | | 5 | 10 | 30 | 1 |

-continued

| Second mixture: | | | | | | |
|---|---|---|---|---|---|---|
| Caustic-calcined magnesia | 1 | 1 | 1 | 1 | 1 | 1 |
| Foaming agent | +0.1 | +10 | +1 | +1 | +1 | +1 |
| Water | +15 | +15 | +15 | +15 | +15 | +15 |
| Pot life (minutes) | 5 | 5 | 5 | 5 | 5 | 5 |
| Setting time (minutes) | 40 | 40 | 40 | 40 | 40 | 40 |
| Strength green | good | slight | medium | medium | medium | medium |
| Strength fired (N/mm$^2$) | 3.0 | 1.2 | 1.2 | 1.0 | 0.8 | 1.5 |
| Bulk density after firing (g/cm$^3$) | 0.75 | 0.6 | 0.6 | 0.55 | 0.4 | 0.65 |
| Firing temperature (°C.) | 1300 | 1300 | 1300 | 1300 | 1300 | 1200 |

| | Example | | |
|---|---|---|---|
| | 13 | 14 | 15 |
| Aluminumhydroxychloride | 4 | 6 | 5 |
| Kaolin (40% Al$_2$O$_3$) | 25 | | |
| Cordierite chamotte (0.1–1 mm) | 30 | | |
| Cordierite chamotte (<0.1 mm) | 40.5 | | |
| Tabular alumina (<0.01 mm) | | 20 | |
| Corundum (0.1–0.5 mm) | | 10 | |
| Corundum (<0.1 mm) | | 63 | |
| Bentonite (suspension agent) | | +0.2 | +0.5 |
| Zirconia (0.1–0.2 mm) | | | 63 |
| Zirconia (<0.1 mm) | | | 30 |
| Water | +35 | +20 | +20 |
| Caustic-calcined magnesia | 0.5 | 1 | 2 |
| Foaming agent | +0.5 | +1 | +1 |
| Water | +15 | +10 | +15 |
| Pot life (minutes) | 4 | 5 | 2 |
| Setting time (minutes) | 40 | 40 | 25 |
| Strength green | slight | medium | medium |
| Strength fired (N/mm$^2$) | 3.0 | 20 | 30 |
| Bulk density after calcining (g/cm$^3$) | 0.75 | 1.3 | 1.8 |
| Calcining temperature (°C.) | 1300 | 1650 | 1700 |

Note:
Amounts in % by weight;
+ indicates additional amounts, i.e. over 100%

We claim

1. A method of producing a refractory brick which comprises:
   providing a foamed, aqueous mixture containing 1–10% of hydrated aluminumhydroxychloride, 0.1–3% of at least one first refractory material selected from the group consisting of sintered magnesia and caustic-calcined magnesia, and 87–97% of a granular second refractory material, said amounts being based on the combined weight of said aluminumhydroxychloride and first and second refractory materials, said foamed, aqueous mixture being prepared by mixing a first mixture containing said hydrated aluminumhydroxychloride, said second refractory material and water, with a second mixture containing said first refractory material, a foaming agent and water;
   introducing said foamed, aqueous mixture into a mold and allowing said mixture to set;
   removing the resultant molded article from said mold and drying said molded article; and
   firing the dried article to produce a refractory brick.

2. The method according to claim 1, wherein said refractory brick has a bulk density of 0.4–1.8 g/cm$^3$.

3. The method according to claim 1, wherein said hydrated aluminumhydroxychloride is Al$_2$(OH)$_5$Cl.2H$_2$O.

4. The method according to claim 1, wherein said hydrated aluminumhydroxychloride is Al$_2$(OH)$_5$Cl.3H$_2$O.

5. The method according to claim 1, wherein said first refractory material has a grain size of under 0.1 mm.

6. The method according to claim 1, wherein said foamed, aqueous mixture contains 3–7% of said hydrated aluminumhydroxychloride, 0.3–1.4% of said caustic-calcined magnesia, and 91.6–96.7% of said second refractory material.

7. The method according to claim 1, wherein said second refractory material is at least one member selected from the group consisting of corundum, kaolin, sintered mullite, sillimanite, chamotte, synthetic cordierite, cordierite-containing aluminosilicate, clay and zirconia, all having a grain size of not greater than 1 mm.

8. The method according to claim 1, wherein said formed, aqueous mixture further contains 1–30% by weight of a combustible substance based on the combined weight of said aluminumhydroxychloride and first and second refractory materials.

9. The method according to claim 8, wherein said foamed, aqueous mixture contains 1–10% by weight of said combustible substance.

10. The method according to claim 1, wherein said second mixture contains 0.1–10% by weight of said foaming agent, which is stable in water at a pH of 3–10, and 1–40% by weight of said water, based on the combined weight of said aluminumhydroxychloride and first and second refractory materials.

11. The method according to claim 1, wherein said first mixture further contains a dispersing agent or suspension agent.

* * * * *